United States Patent [19]
Altmann et al.

[11] Patent Number: 5,370,481
[45] Date of Patent: Dec. 6, 1994

[54] DRILL PRESS FOR STEREOTAXIC MANIPULATOR

[75] Inventors: Bert L. Altmann, Long Beach; J. David Kopf, Tujunga, both of Calif.

[73] Assignee: David Kopf Instruments, Tujunga, Calif.

[21] Appl. No.: 116,997

[22] Filed: Sep. 7, 1993

[51] Int. Cl.$^5$ .................... B23B 47/18; B23B 47/26
[52] U.S. Cl. .................... 408/129; 408/235; 408/237; 409/185; 606/180
[58] Field of Search ............. 408/129, 136, 111, 112, 408/235, 712, 17, 234, 237; 409/185; 606/80, 167, 170, 171, 180, 185

[56] References Cited

U.S. PATENT DOCUMENTS

| | | | |
|---|---|---|---|
| 1,829,393 | 10/1931 | Carter | 409/185 |
| 3,088,341 | 5/1963 | Roman-Garcia | 408/17 |
| 3,216,032 | 11/1965 | Hoffman | 408/235 |

FOREIGN PATENT DOCUMENTS 2301917  7/1974  Germany ............. 408/234

*Primary Examiner*—Steven C. Bishop
*Attorney, Agent, or Firm*—Bruce H. Johnsonbaugh

[57] ABSTRACT

A drill press is provided for use in conjunction with a three dimensional stereotaxic manipulator. The drill press includes a body carried by a movable member of the manipulator wherein the body has upper and lower segments and at least one guide shaft extending between the segments. A slide which carries a drill for forming skull openings is driven by a dial cord drive. The dial cord extends around a drive shaft so that rotation of the drive shaft by a handle causes the slide to move upwardly and downwardly to safely and quickly accomplish the formation of a skull opening in a small animal typically used in brain research.

4 Claims, 4 Drawing Sheets

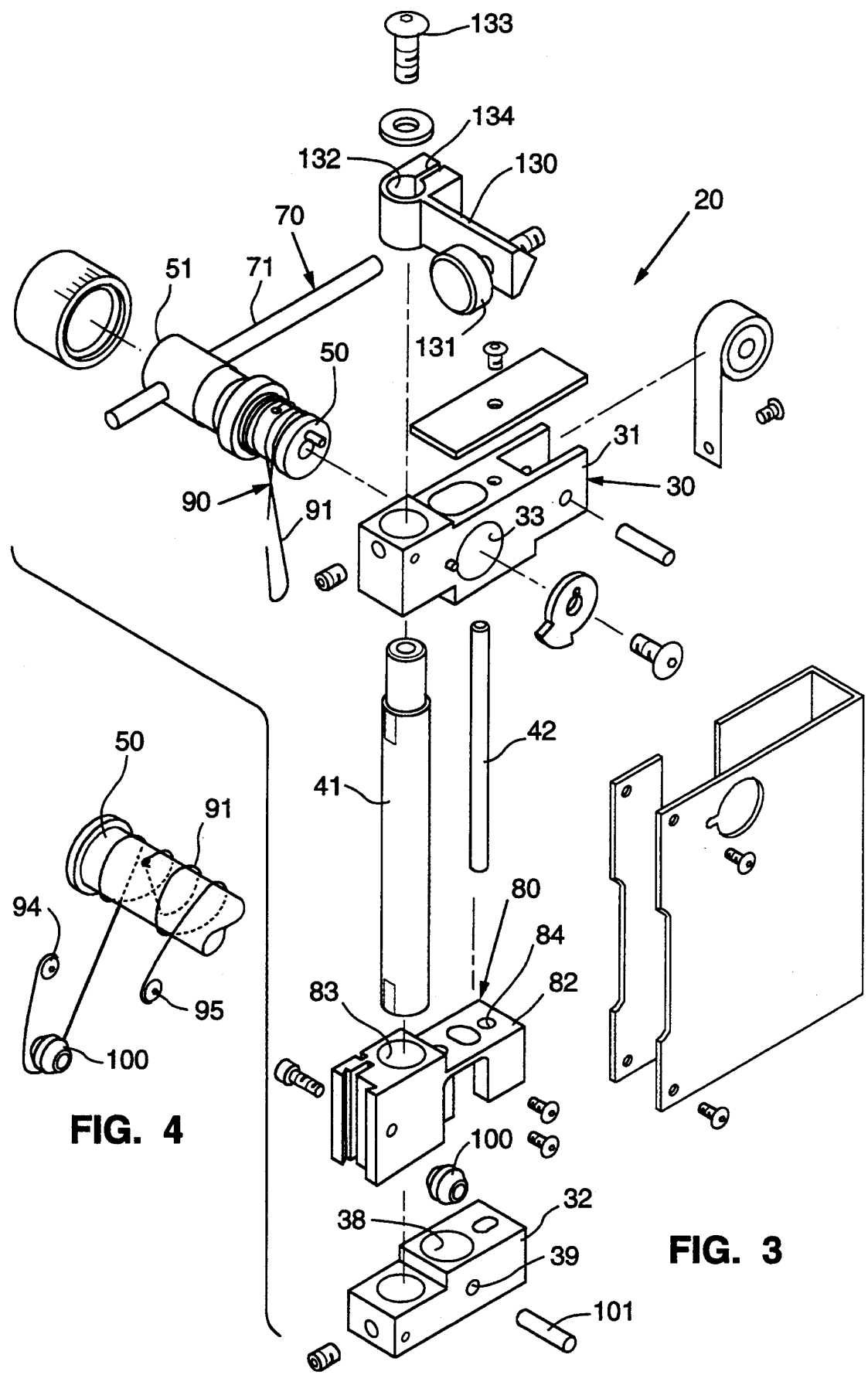

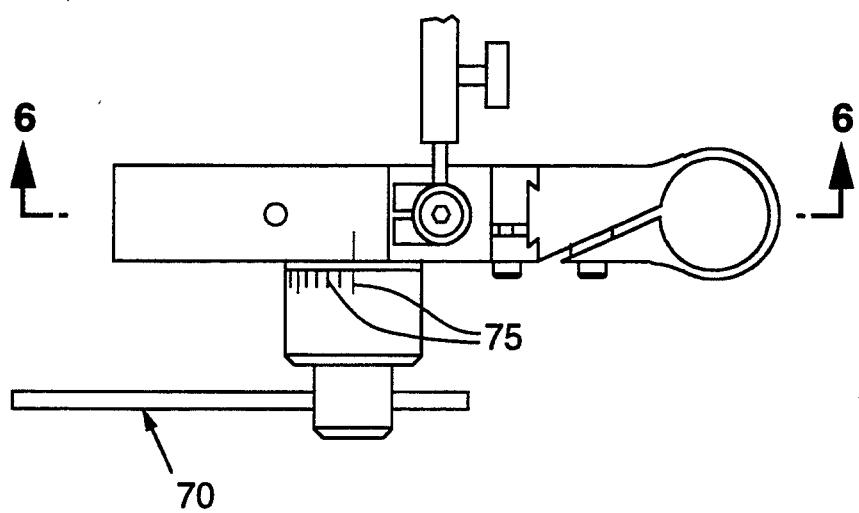
FIG. 5
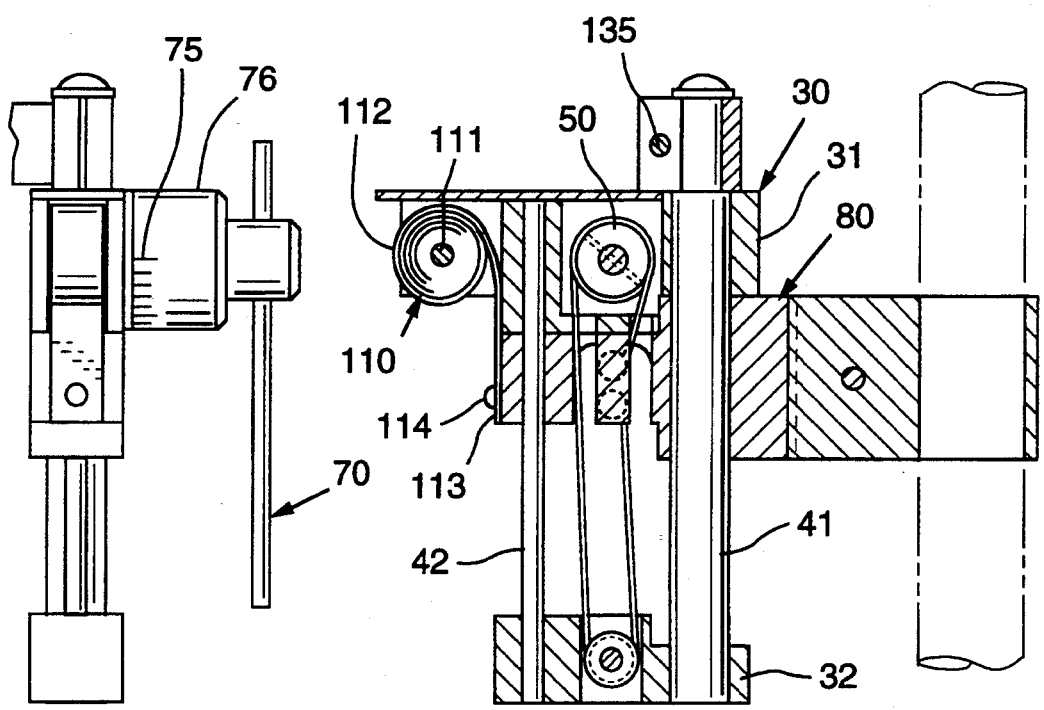
FIG. 7  FIG. 6
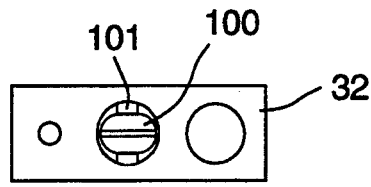
FIG. 8

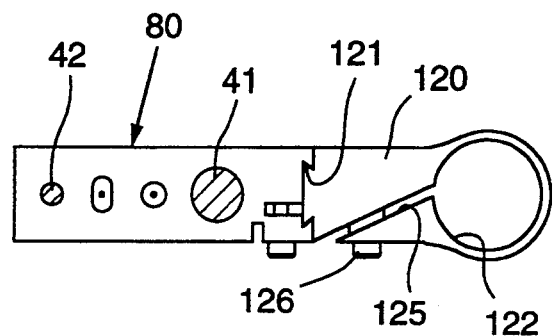
FIG. 11
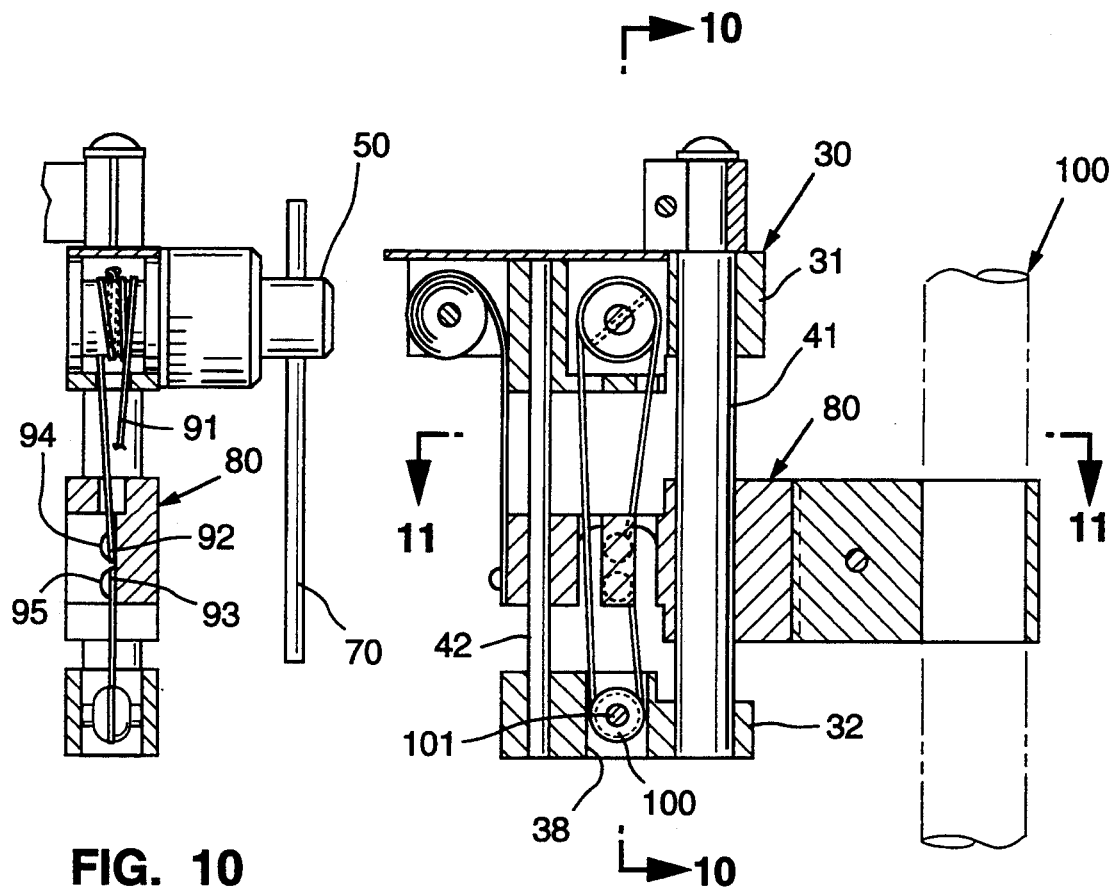
FIG. 10
FIG. 9

DRILL PRESS FOR STEREOTAXIC MANIPULATOR

BACKGROUND OF THE INVENTION

This invention relates generally to stereotaxic instruments used in brain research. More specifically, the invention relates to small animal brain research wherein it is necessary to insert electrodes or lesion generation devices into the brain of the animal under study.

It is essential to utilize devices which support the head of the animal while under anesthesia. It is also important that three dimensional manipulators be used to carefully monitor the coordinates in which the medical instruments are used.

BRIEF SUMMARY OF THE INVENTION

The present invention relates to a drill press for use with a three dimensional stereotaxic manipulator which provides an improved mechanism for forming an opening in the skull of an anesthetized animal under study. The anesthetized animal typically has its head held motionless in a stereotaxic device which utilizes, for example, ear bars to support and steady the head. Alternately, a tooth bar, pallet clamp or an eye bar which contacts the inner orbital ridge to steady the head may be used. The present invention may be used with any of these mechanisms for steadying the head of the animal.

The present invention resides in a drill press which is carried by the three dimensional manipulator. The drill press reduces unsteadiness and vibration which sometimes occur in devices of the prior art. The drill press of the present invention facilitates the formation of an opening in the skull with a minimum of motion or vibration, which also increases the safety of the animal.

It is known in the prior art to use a three dimensional stereotaxic manipulator as shown in FIG. 1 of the drawings to form openings in the skull. However, the prior art mechanism required considerably more time to form the opening compared to the present invention. In addition, the prior art mechanism sometimes produced unwanted vibration, which is minimized or reduced altogether by the present invention.

A primary object of the present invention is to provide a drill press for use in conjunction with a three dimensional stereotaxic manipulator which is capable of forming skull openings quickly and with minimum risk to the animal.

A further object of the invention is to provide a stereotaxic drill press of sturdy and dependable design.

Other objects and advantages of the invention will become apparent from the following description of the preferred embodiment and the drawings wherein:

BRIEF DESCRIPTION OF THE DRAWINGS

FIG. 3 is an exploded view in perspective of the components of the drill press according to the present invention;

FIG. 4 is a perspective representation of a portion of the drill press according to the present invention;

FIG. 5 is a plan view of the drill press according to the present invention;

FIG. 6 is a section on the line 6—6 of FIG. 5;

FIG. 7 is a front elevational view of the drill press of the present invention;

FIG. 8 is a bottom view of the drill press shown in FIG. 6;

FIG. 9 is a sectional view of the drill press shown in its alternate position to that shown in FIG. 6;

FIG. 10 is a sectional view on the line 10—10 of FIG. 9; and

FIG. 11 is a sectional view on the line 11—11 of FIG. 9.

DETAILED DESCRIPTION OF THE DRAWINGS

Figure 1:
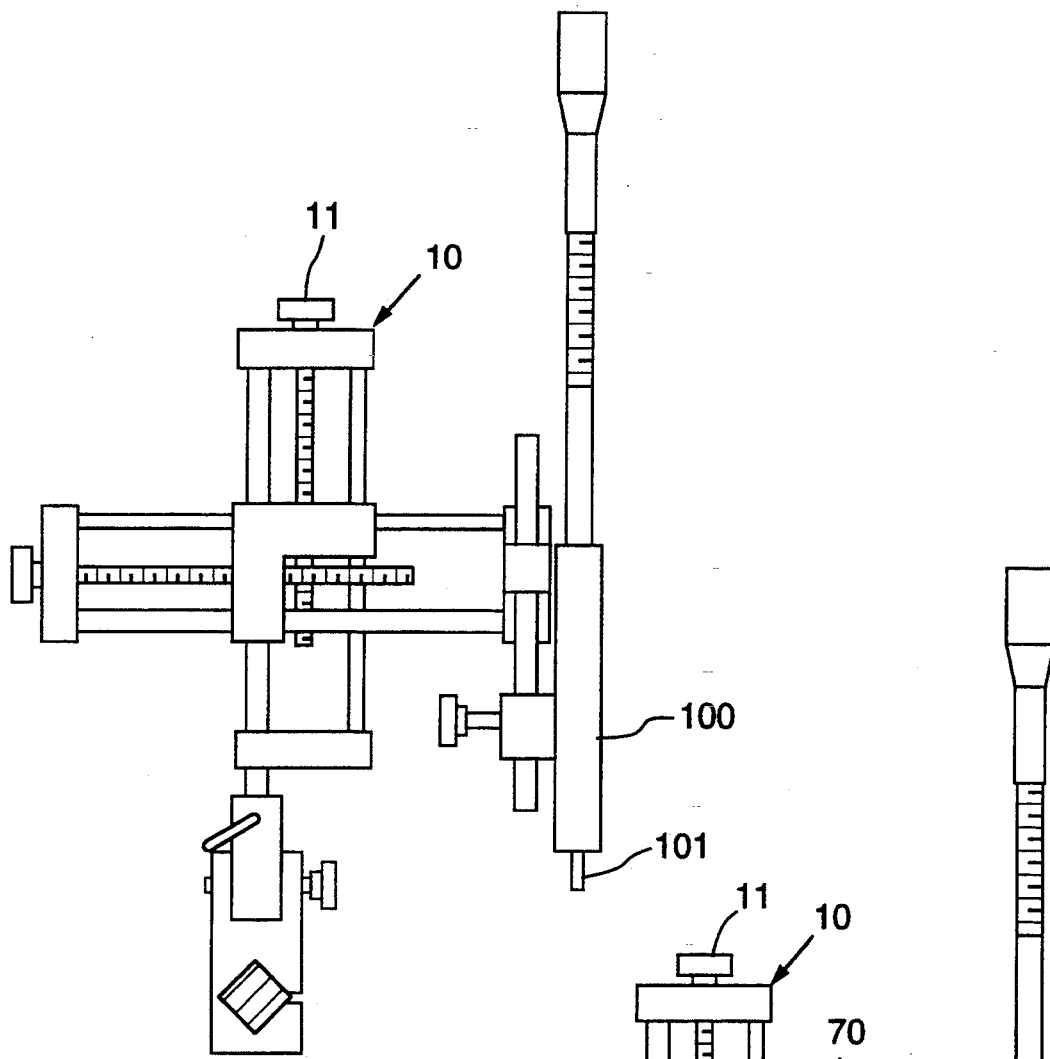
FIG. 1 is a side elevational view of a prior art three dimensional stereotaxic manipulator being used to form an opening in the skull of an animal under study.

FIG. 1 shows a front elevational view of a prior art three dimensional stereotaxic manipulator set up to carry a drill 100 for forming an opening in the skull of an animal under study. The drill bit 101 is properly positioned adjacent the animal's skull by using the prior art manipulator 10. At that point, thumbscrew 11 is rotated to drive bit 101 downwardly, thereby forming the skull opening.

Figure 2:
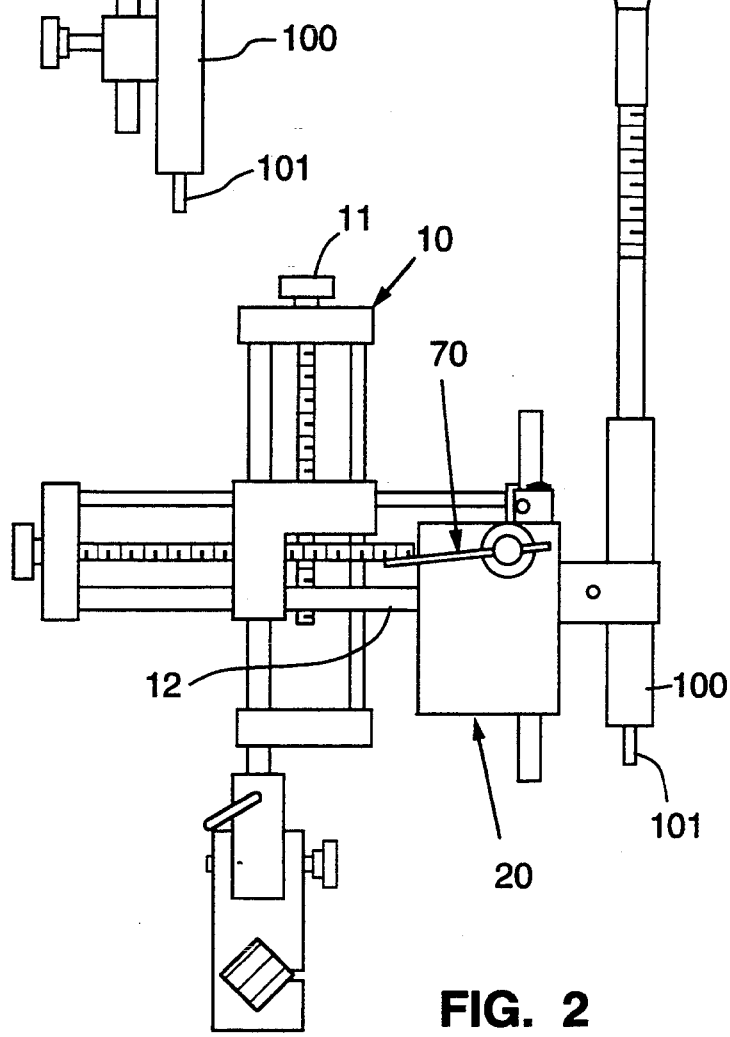
FIG. 2 is a side elevational view of a three dimensional stereotaxic manipulator incorporating the drill press of the present invention.

FIG. 2 shows the three dimensional stereotaxic manipulator 10 of the prior art fitted with drill press 20 according to the present invention. In using the present invention, the manipulator 10 is operated to position the drill 100 and bit 101 to the proper and precise position adjacent the skull of the animal. Handle means 70 is then rotated in a clockwise direction shown in FIG. 2 which causes bit 101 to be driven downwardly quickly forming the skull opening with the minimum of movement or vibration of the manipulator 10. Whereas the prior mechanism of FIG. 1 required the user to repeatedly turn thumbscrew 11 to achieve the skull opening, the drill press 20 of the present invention allows the user to simply rotate handle 70 and the skull opening is more quickly formed with a minimum of vibration.

FIG. 3 is an exploded view of the components of the drill press 20. A body shown generally as 30 includes upper body segment 31 and lower body segment 32 which are connected to guide shafts 41 and 42. These components are shown in FIGS. 6 and 9 in their assembled configuration. The body 30 of the drill press 20 is carried by movable member 12 of manipulator 10.

As shown in FIG. 2, drill 100 is shown in a vertical position, but it is understood that the drill may alternately be oriented at various angles to the vertical depending on the particular research being conducted.

A drive shaft 50 is carried by a cylindrical passageway 33 formed in upper body segment 31. Drive shaft 50 is oriented perpendicularly to guide shafts 41 and 42.

Handle means 70 comprising an elongated cylindrical bar 71 is connected to one end 51 of drive shaft 50.

A slide means 80 includes a member 82 having two parallel passageways 83 and 84 formed therein which slidably engage guide shafts 41 and 42, respectively.

Slide means 80 slides on guide shafts 41 and 42 from a first position shown in FIG. 6 adjacent upper body segment 31 to a lower position shown in FIG. 9 where slide means 80 approaches lower body segment 32.

Dial cord means 90 comprises an elongated cord 91 having ends 92 and 93 firmly connected to slide means 80 by set screws 94 and 95, respectively (FIG. 10). Cord means 90 extends around drive shaft 50 with several windings to increase the friction between drive shaft 50 and cord 91 (FIGS. 3 and 10). Pulley means 100 is carried by lower body segment 32 by pin 101 which extends through passageway 39 formed in lower body segment 32. Pulley 100 is mounted in a cylindrical passageway 38 formed in lower body segment 32 (FIGS. 3 and 9). Dial cord 91 extends around pulley means 100 as shown schematically in FIG. 4.

When the user rotates handle means 70 from its position shown in FIG. 2 in the clockwise direction, slide means 80 is driven from its uppermost position shown in FIG. 6 to a lower position such as shown in FIG. 9. In the preferred embodiment, handle means 70 may be rotated 270° to achieve a 25 mm stroke. As shown in FIGS. 5 and 7, a calibrated scale 75 is formed on hub 76 which rotates with handle means 70. The user can simply achieve a desired stroke of the drill bit 101 by rotating the handle means 70 through a given rotation shown by calibrations 75.

As shown best in FIG. 6, a counterbalancing spring means 110 is carried by upper body segment 31 by a pin 111. Counter-balancing spring means 110 is known as a "Neg'ator" spring 112 which is an elongated strap connected at one end 113 to slide means 80 by a set screw 114. The strap 112 is coiled around pin 111 and urges slide means 80 toward upper body segment 31.

As shown best in FIG. 11, a dovetail slide adaptor 120 is provided which is carried by slide means 80 by a dovetail groove 121 formed in slide means 80 into which adaptor 120 slides. Adaptor 120 has a cylindrical passageway 122 formed therein to carry drill means 100 (FIG. 9). Adaptor 120 may be tightened around drill means 100 by the formation of slot 125 and set screw 126.

The drill press 20 is connected to the three dimensional manipulator by a "V-bar" 130 (FIG. 3) which is carried by a tapered recess in member 12 of the manipulator. Thumbscrew 131 firmly attaches drill press 20 to the manipulator when tightened. Cylindrical passageway 132 is formed in "V-bar" 130 and receives a set screw 133 which threads into guide shaft 41. "V-bar" 130 has a slot 134 and set screw 135 (FIG. 6). Loosening set screw 135 allows the user to rotate the drill press 20 about the vertical axis of guide shaft 41.

We claim:

1. A drill press for use in conjunction with a three dimensional stereotaxic manipulator wherein said manipulator includes a member movable along an axis to predetermined positions on said axis, said drill press comprising:

a body carried by said movable member of said manipulator, said body including upper and lower segments and a guide shaft extending between said upper and lower body segments, a drive shaft carried by said body, handle means carried by said drive shaft, slide means carried by said body, said slide means being adapted to slide on said guide shaft between said upper and lower body segments, dial cord means connected to said slide means and extending around said drive shaft whereby rotation of said drive shaft by rotation of said handle means causes said slide means to move on said guide shaft between said upper and lower body segments, and drill means carried by said slide means.

2. The apparatus of claim 1 further comprising pulley means carried by said lower body segment, and said dial cord means extends around said pulley means.

3. The apparatus of claim 2 further comprising a counter-balancing spring means carried by said upper body segment and connected to said slide means, whereby said spring means urges said slide means toward said upper body segment.

4. The apparatus of claim 1 further comprising a dovetail slide adaptor carried by said slide mans said drill means being carried by said dovetail slide adaptor.

* * * * *